United States Patent
Fehrenbach et al.

(10) Patent No.: US 12,066,068 B2
(45) Date of Patent: Aug. 20, 2024

(54) BRAKE MODULE OF A WHEEL MODULE HAVING A WHEEL DRIVABLE ABOUT A WHEEL AXIS BY A DRIVE MODULE AND INDEFINITELY STEERABLE ABOUT A STEERING AXIS

(71) Applicant: ebm-papst St. Georgen GmbH & Co. KG, St. Georgen (DE)

(72) Inventors: Johannes Fehrenbach, Unterkimach (DE); Jörg Hornberger, Dornstetten-Aach (DE); Wolfgang Hermann, Schramberg (DE); Volker Messmer, Tengen (DE); Jürgen Besch, Dauchingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 841 days.

(21) Appl. No.: 17/146,590

(22) Filed: Jan. 12, 2021

(65) Prior Publication Data

US 2021/0213914 A1 Jul. 15, 2021

(30) Foreign Application Priority Data

Jan. 14, 2020 (DE) .................... 10 2020 100 637.3

(51) Int. Cl.
*F16D 63/00* (2006.01)
*B60B 33/00* (2006.01)
(Continued)

(52) U.S. Cl.
CPC ........ *F16D 63/006* (2013.01); *B60B 33/0084* (2013.01); *B60K 7/0007* (2013.01);
(Continued)

(58) Field of Classification Search
CPC .... F16D 65/16; F16D 2121/22; F16D 63/006; F16D 2125/70; B60B 33/0084;
(Continued)

(56) References Cited

U.S. PATENT DOCUMENTS 2,254,115 A * 8/1941 Claytor ................ F16H 3/78
188/69
5,012,550 A * 5/1991 Schlosser ............ B60B 33/0049
16/35 R
(Continued)

FOREIGN PATENT DOCUMENTS

CN 103620255 A 3/2014
CN 207916456 U 9/2018
(Continued)

OTHER PUBLICATIONS

Chinese Search Report dated Jun. 25, 2023 in corresponding Chinese Application No. 2021100303235.

*Primary Examiner* — Robert A. Siconolfi
*Assistant Examiner* — San M Aung (57) ABSTRACT

A brake module (1) of a wheel module (2) has an anchor plate (20) adjacent to a wheel (10) and is indefinitely rotatable about the steering axis (L) with the wheel (10). A lifting unit (30) is fixed adjacent to the anchor plate (20) and fixed about the steering axis (L). A brake wheel (21) is arranged on the wheel shaft (11) and is rotatable about the wheel axis (R) with the wheel (10). At least one transfer element (22, 22') extends from the anchor plate (20) towards the brake wheel (21). The lifting unit (30) is configured to move the anchor plate (20) from a first state to a second state. In the first state, the elements (20, 30, 22, 22') are spaced apart without any contact. In the second state, the at least one transfer element (22, 22') abuts against the brake wheel (21) generating a brake force at the brake wheel (21).

13 Claims, 4 Drawing Sheets

(51) Int. Cl.
  *B60K 7/00* (2006.01)
  *B62D 5/04* (2006.01)
  *F16D 65/16* (2006.01)
  *F16D 121/22* (2012.01)
  *F16D 125/70* (2012.01)

(52) U.S. Cl.
  CPC ........... *B62D 5/0418* (2013.01); *F16D 65/16* (2013.01); *B60B 33/0068* (2013.01); *B60K 2007/003* (2013.01); *B60K 2007/0084* (2013.01); *F16D 2121/22* (2013.01); *F16D 2125/70* (2013.01)

(58) Field of Classification Search
  CPC ........... B60B 33/0092; B60B 33/0073; B60B 33/0068; B60K 7/0007
  USPC .......................................................... 188/69
  See application file for complete search history.

(56) References Cited

U.S. PATENT DOCUMENTS

| | | | |
|---|---|---|---|
| 5,113,977 A | | 5/1992 | Ridings et al. |
| 5,829,096 A | * | 11/1998 | Perry ................. B60B 33/0081 16/35 R |
| 2012/0111672 A1 | * | 5/2012 | Park ................... B60B 33/0073 188/69 |
| 2014/0000989 A1 | * | 1/2014 | Lai ........................ A45C 5/145 188/69 |
| 2016/0265609 A1 | * | 9/2016 | Corsetti ................. F16D 41/12 |
| 2019/0193784 A1 | * | 6/2019 | Wach ................. B60B 33/0049 |
| 2019/0263376 A1 | | 8/2019 | Ihle et al. |

FOREIGN PATENT DOCUMENTS

| | | |
|---|---|---|
| CN | 208164664 U | 11/2018 |
| DE | 202014003033 U1 | 7/2015 |
| DE | 202018106118 U1 | 11/2018 |

\* cited by examiner

BRAKE MODULE OF A WHEEL MODULE HAVING A WHEEL DRIVABLE ABOUT A WHEEL AXIS BY A DRIVE MODULE AND INDEFINITELY STEERABLE ABOUT A STEERING AXIS

CROSS-REFERENCE TO RELATED APPLICATION

This application claims priority to German Application No. 10 2020 100 637.3, filed Jan. 14, 2020. The disclosure of the above application is incorporating herein by reference.

FIELD

The disclosure relates to a brake module of a wheel module with a wheel drivable about a wheel axis by a drive module of the wheel and steerable about a steering axis. The wheel is indefinitely rotatable about the steering axis by the drive module.

BACKGROUND

In the state of the art, a plurality of different brake modules and/or brake systems for steerable wheels are known. These known brake modules are usually provided directly at the wheel shaft or the steerable wheel and rely on an energy supply designed to compensate a steering movement of the wheel. To this end, for example, sliding contacts, an inductive energy transfer or drag chain solutions are provided.

However, for wheel modules where the wheel is indefinitely rotatable about the steering axis, steerable, the connection and energy supply of the brake module must not restrict the rotatability of the wheel about the steering axis. Therefore, only inductive energy transfer and sliding contact solutions can be contemplated. However, sliding contact solutions, in particular, are subject to wear and therefore result in maintenance cost and/or a reduced service life. Integration of an inductive energy transfer is in turn complicated and expensive. In addition, an inductive energy transfer is subject to a relatively low efficiency and high current consumption. Thus, such a solution can usually not be implemented in an energy efficient manner.

SUMMARY

Thus, it is the object of the disclosure to overcome the above-mentioned disadvantages and to provide a brake module of a wheel module with a brake module where the wheel can be braked by the brake module and the steerability of a wheel indefinitely rotatable about a steering axis is not restricted by the brake module.

This object is achieved by the combination of features according to a brake module of a wheel module with a wheel. The wheel is drivable about a wheel axis by a drive module of the wheel module and steerable about a steering axis. The wheel is received on a wheel shaft and is indefinitely rotatable about the steering axis by the drive module. The brake module has an anchor plate arranged adjacent to the wheel and is indefinitely rotatable about the steering axis with the wheel. A lifting unit is fixed adjacent to the anchor plate about the steering axis. A brake wheel is arranged at the wheel shaft and is rotatable about the wheel axis with the wheel. At least one transfer element extends from the anchor plate towards the brake wheel. The lifting unit is configured to move the anchor plate from a first state to a second state. In the first state, the anchor plate and the lifting unit as well as the at least one transfer element and the brake wheel are spaced apart without any contact. In the second state, the anchor plate and the lifting unit are spaced apart without any contact and the at least one transfer element generates a brake force at the brake wheel.

According to the disclosure, a brake module of a wheel module is proposed. The wheel module has a wheel that is drivable about a wheel axis by a drive module of the wheel module and steerable about a steering axis. The wheel is received, fixed for co-rotation, at the wheel shaft and indefinitely rotatable about the steering axis by the drive module. The brake module has an anchor plate arranged adjacent to the wheel and is indefinitely rotatable about the steering axis with the wheel. A lifting unit is fixed adjacent to the anchor plate and about the steering axis. A brake wheel is arranged, fixed, at the wheel shaft and is rotatable about the wheel axis with the wheel. At least one transfer element extends from the anchor plate towards the brake wheel. In addition, the lifting unit is configured to move the anchor plate from a first state to a second state. In the first state, the anchor plate and the lifting unit as well as the at least one transfer element and the brake wheel are spaced apart without any contact. In the second state, the anchor plate and the lifting unit are spaced apart without any contact and the at least one transfer element directly or indirectly generates a brake force at the brake wheel. Preferably, the anchor plate is rotatable about the steering axis with the wheel and in every state is spaced apart from the lifting unit along the steering axis and is not connected to the lifting unit structurally or by connecting elements for energy transfer, such as cables. Thus, the rotation of the anchor plate is not restricted or braked by the lifting unit.

The disclosure background is to provide a brake module with a mechanical brake for a so-called drive-steering unit or drive-steering system (DSS) that does not restrict the steerability of the DSS. A DSS, which is, for example, used in battery operated driverless transport vehicles, preferably includes a wheel that, in order to improve the maneuverability, can be indefinitely rotated, theoretically an infinite number of times, about its steering axis. This is solved by a special mechanical design explained later. The drive of such a wheel is preferably realized via two electric motors. Also, an electric brake and/or an electric recuperation can be implemented via the electric motors. In addition, in an advantageous alternative of such a DSS, it is required to provide a mechanical brake, which due to the wheel being freely rotatable about the steering axis, however, must not restrict the rotatability of the wheel.

Therefore, the basic concept of the disclosure is to divide the brake module into two separate assemblies. Two assemblies freely rotatable about the steering axis with respect to each other. A first assembly is arranged at the wheel and is configured to rotate about the steering axis with it. The second assembly is fixed, stationary, with respect to the steering axis and is configured to transfer energy to the first assembly for switching the brake or to transfer the first assembly from a first state, not braking the wheel, to a second state braking the wheel.

Preferably, the first assembly comprises the anchor plate with the at least one transfer element. The brake wheel is spaced apart from the second assembly corresponding to the lifting unit by an air gap. The lifting unit, for example, comprises an electromagnet as a lifting magnet. The anchor plate is movable along the steering axis and the brake thus switchable via the electromagnet.

According to an advantageous alternative, the movability of the anchor plate along the steering axis is mechanically restricted in both directions by one or several stops. The anchor plate is preferably received and guided in a slide bushing in the radial direction towards the steering axis. The movability is restricted by the stop adjacent to the lifting unit such that an air gap, allowing a relative rotation of the anchor plate with respect to the lifting unit, always remains between the anchor plate and the lifting unit.

According to an advantageous embodiment of the disclosure, the brake module has a support element adjacent to the wheel that is rotatable about the steering axis with the wheel. The wheel shaft is supported rotatably about the wheel axis so that the support element, with respect to the rotation of the wheel about the steering axis, is coupled to the wheel and, with respect to the rotation about the wheel axis, is decoupled from the wheel. The anchor plate is further movable along the steering axis with respect to the lifting unit and with respect to the support element, fixedly connected to the support element about the steering axis. For example, via a slide guide so that the anchor plate, guided by the support element, can rotate about the steering axis with the wheel, but simultaneously can be moved along the steering axis by the lifting unit. Alternatively, such a connection can also be implemented via the at least one transfer element, which is, for example, supported at the support element directly or indirectly movable along the steering axis.

Alternatively, a variation from the support element would also be possible, where one or several follower elements are configured at the anchor plate abutting against the brake wheel, the wheel or the wheel shaft, for example, via slide plates. This, however, results in a friction between the slide plates and the respective additional element, which is detrimental to energy efficiency.

Preferably, the brake module is not implemented as a braking device braking and/or decelerating the rotation, but as a braking device preventing the rotation, fixing the wheel, as a locking brake. According to a particularly advantageous embodiment, to this end, the brake wheel is a cam wheel and has, at its outer circumference, at least one cam extending outwardly in the radial direction of the brake wheel. A projection protruding with respect to the outer circumference of the brake wheel or, preferably a plurality of cams or projections evenly circumferentially distributed at the outer circumference of the brake wheel and extending outwardly.

To prevent rotation of the wheel via such a cam or several such cams and to fix the wheel, according to a variation of the disclosure, a pawl is provided at the transfer element at an end section of the at least one transfer element facing the brake wheel. The pawl, which is preferably wedge shaped, in the first state, is spaced apart from the brake wheel. In the second state, the pawl abuts against the brake wheel with a latching section facing the brake wheel. If the pawl is of a wedge shaped design, the latching section preferably corresponds to the section where the opposing surfaces meet each other thus determining the wedge shape. The latching section is configured to abut against a cam of the brake wheel, against the one cam or against one of the cams of the brake wheel, in a direction opposite to a rotational direction of the brake wheel. Upon a beginning rotation of the wheel or a torque at the wheel in the rotational direction, the cam is pressed against the pawl. The latching section of the pawl, with one of its lateral surfaces facing the circumferential direction of the brake wheel, blocks the rotation. To generate the brake torque, cams are attached or configured at the brake wheel that are blocked by a pawl mechanism. To release the brake torque, the pawls and accordingly the complete anchor plate with the transfer element and the associated pawl are drawn by the lifting unit, preferably electromagnetically, to the first state, towards the lifting unit, and the pawl is released from its engagement with the brake wheel.

According to one particularly advantageous embodiment, the geometry of the lateral surfaces of the cams and the geometry of the latching section as well as the alignment of the pawl with respect to the brake wheel is selected such that a cam that is pressed against the latching section with its lateral surface does not move the pawl, and in particular the anchor plate, towards the lifting unit thus inadvertently releasing the brake.

If a pawl is provided for engagement with or abutting against the cams, it is preferably rotatably supported about an axis parallel to the wheel axis with a support section spaced apart from the latching section. The pawl is supported at the respective transfer element or the support element. Preferably, a respective pawl can also be supported at a pawl receptacle, which is connected to the support element through a bearing ring, for example. A lifting mechanism can be provided at each of the rotatably supported pawls allowing the respective pawl to be moved out of the respective transfer element and thus to be switched between the first and the second state. To this end, a hole or a slot parallel to the steering axis can be provided in each of the transfer elements. The hole or slot is engaged by a pin provided at the pawl parallel to the rotary axis of the pawl. The advantage of a slot is that in the second state, the pawl is not pressed against the brake wheel by the transfer element, but the pawls abut loosely against the brake wheel. Thus, the pawl latches at the cam, as the brake wheel rotates in a first direction. If the brake wheel rotates in an opposite second direction, the pawl is lifted by a cam.

To block the rotation of the wheel in both possible rotational directions about the wheel axis, according to a particularly advantageous embodiment of the brake module, exactly two transfer elements are spaced apart from each other. Each has a pawl provided at each of their end sections facing the brake wheel, the latching sections face each other and one pawl each can be lifted or lowered with the respective end section facing the brake wheel. The latching section of a first pawl of a first transfer element of the two transfer elements is configured to abut against one cam, against the one cam or against one of the cams, in a direction opposite to a first rotational direction. The latching section of a second pawl of a second transfer element of the two transfer elements is configured to abut against one cam, against the one cam or against one of the cams, in a direction opposite to a second rotational direction opposite to the first rotational direction. If an individual cam is provided at the brake wheel, the wheel can thus be fixed in a predetermined alignment.

With respect to the rotation of the wheel about the steering axis, the pawl mechanism formed by pawls is mounted so that it rotates with the wheel. Due to the pawls latching at the cam or the cams, without the cams, the brake wheel, being able to move the anchor plate, in the second state, in the state blocking the rotation of the wheel, no energy transfer to the anchor plate is required.

According to an advantageous variation of the disclosure, the lifting unit also comprises an electromagnet and the anchor plate is magnetic or ferromagnetic and preferably soft magnetic, at least in sections. The electromagnet is configured to magnetically draw the anchor plate towards the lifting unit in the first state. Preferably, it is provided that the anchor plate is transferred from the first state to the second state by gravity. Here, the electromagnet of the lifting unit switches off so that the brake module, for example, in case of a power failure, is automatically transferred to the second state blocking the rotation of the wheels. To this end, a spring can also be provided that can support a return of the brake module to the state blocking the wheel. To maintain the anchor plate in the first state, where the rotation of the wheel is not blocked, a low current must constantly flow maintaining the magnetic field of the electromagnet of the lifting unit attracting the anchor plate.

Also in the released or first state of the brake module, the rotating part of the brake module, for example, the anchor plate, and the stationary part, fixed, with respect to the steering axis, the lifting unit, do not contact each other, as the brake release energy is transferred electromagnetically via the air gap between the anchor plate and the lifting unit.

In a variation, where no spring return of the anchor plate or any other force counteracting the movement at the anchor plate is provided, an energy-saving effect is achieved by the fact that only the anchor plate, with the transfer elements, and the pawls, potentially present at the transfer elements, need to be lifted and that it is not necessary to counteract brake springs.

As an alternative to an electromagnet, the space between the anchor plate and the lifting unit could also be sealed and subjected to negative pressure. Thus, the anchor plate is drawn towards the lifting unit.

To prevent damage to the drive module and/or the brake module in case of an error and to decouple them from each other, according to another advantageous variation, the brake wheel is arranged on a sliding hub and connected to the wheel shaft via the sliding hub. The sliding hub is configured to transfer the brake force from the brake wheel to the wheel shaft, below an adjustable torque and to rotate freely with respect to the brake wheel, from the adjustable torque onwards so that the brake wheel is decoupled from the wheel shaft and the brake force is not transferred from the brake wheel to the wheel shaft. Accordingly, this variation of the disclosure, does not require to release the spring force of this sliding hub designed as a sliding clutch during operation. Preferably, according to a variation, the steering axis is coaxial to a vertical axis of the wheel to further improve the maneuverability. Thus, the wheel is not rotated about a steering axis extending outside the wheel, but about a vertical axis of the wheel, in particular, extending through the point of contact of the wheel with the ground and orthogonal to the ground so that in case of a steering movement, the wheel can rotate around itself on the spot.

In addition, a guide pin can be provided at the anchor plate, through which the anchor plate is supported at another component. Also the lifting element is rotatable about the steering axis and movable along the steering axis.

A further aspect of the disclosure relates not only merely to the brake module, but also to the wheel module with a brake module according to the disclosure and a wheel drivable about a wheel axis by a drive module of the wheel module and steerable about a steering axis. The wheel is received, fixed, at a wheel shaft and is indefinitely rotatable about its steering axis by the drive module.

According to an advantageous variation of the wheel module, it has a transmission with a first and second drive gear ring that are rotatably arranged about a shared rotational axis, coaxial to each other. By a respective rotation of the first drive gear ring and the second drive gear ring, the wheel is both steerable about the steering axis and simultaneously drivable about the wheel axis. A wheel receiving space extends along the rotational axis between the first drive gear ring and the second drive gear ring where the wheel is arranged, at least in sections.

Preferably, the rotational axis of the first and second drive gear ring is coaxial to the steering axis.

For a particularly space-saving and compact design, the anchor plate is arranged in or immediately adjacent to the wheel receiving space. The lifting unit is arranged in or immediately adjacent to the wheel receiving space, The brake wheel as well as the at least one transfer element are arranged in the wheel receiving space.

The features disclosed above can be used in any combination, as far as this is technically feasible and they do not contradict each other.

Other advantageous refinements of the disclosure are characterized in the dependent claims and will be described in greater detail in the following in conjunction with the description of the preferred embodiment of the disclosure, with reference to the figures.

DRAWINGS

Other advantageous embodiments of the disclosure are designated in the dependent claims and/or are described in further detail below along with the description of the preferred embodiment of the disclosure with reference to the figures. In the figures:

DETAILED DESCRIPTION

The figures are schematic for illustration. Like reference numbers in the figures indicate like functional and/or structural features.

Figure 1:
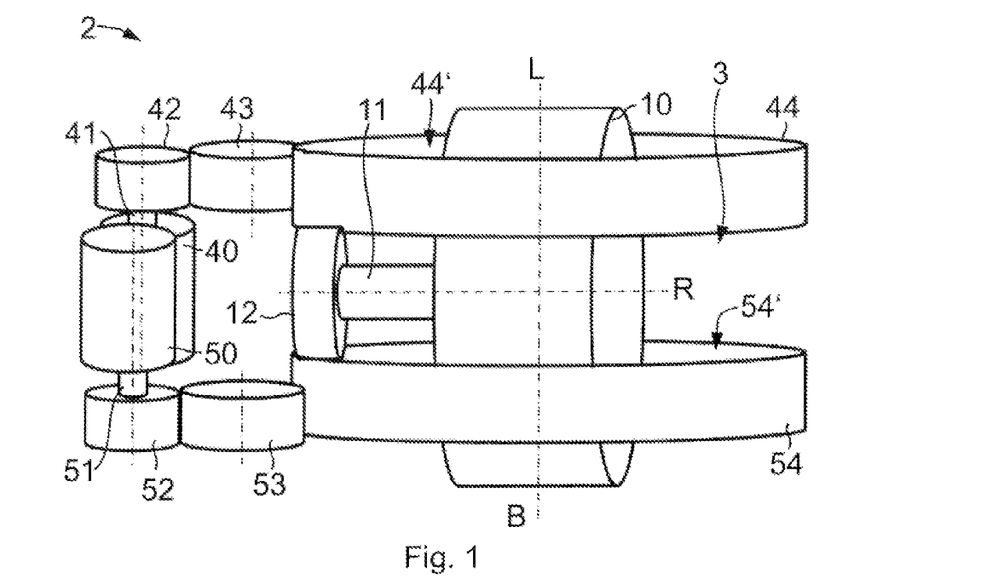
FIG. 1 is a schematic perspective view of a first variation of a wheel module.

FIG. 1 shows the wheel module 2 together with two drive motors 40, 50 to form the drive module of the wheel module 2. The first drive motor 40 drives the first drive gear ring 44, via a first motor shaft 41, and interjacent gears 42, 43. The second drive motor 50 drives the second drive gear ring 54 via a second motor shaft 51 and interjacent gears 52, 53. To minimize the design space requirements, the first drive motor 40 is arranged opposite the second drive motor 50. The drive motors 40, 50 can each include their own motor transmission and can be controlled independently of each other. The drive motors 40, 50 are each connected to one pinion 42, 52 via the respective motor shaft 41, 51.

The first pinion 42, engages with its teeth, with a first intermediate gear 43. The first intermediate gear 43 engages, with its teeth, with the first drive gear ring 44. Thus, upon rotation of the first pinion 42, the first drive gear ring 44 is rotatable about the steering axis L driven by the first drive motor 40.

The same applies analogously to the second drive gear ring 54. The second pinion 52 engages, with its teeth, teeth of a second intermediate gear 53, which teeth engage with teeth of the second drive gear ring 54. Thus, upon rotation of the second pinion 52, the second drive gear ring 54 is rotatable about the steering axis L driven by the second drive motor 50.

An output gear 12 is arranged between the first and the second drive gear ring 44, 54 with its teeth meshing with teeth of the first drive gear ring 44 facing the output gear 12 as well as with teeth of the second drive gear ring 54 facing the output gear 12. The rotation of the output gear 12 (third rotation) is consequently determined by both the rotation of the first drive gear ring 44 (first rotation) and the rotation of the second drive gear ring 54 (second rotation).

An output shaft is connected for co-rotation to the output gear 12 rotation, which corresponds to the wheel shaft 11, that extends from the output gear 12 along a wheel axis R in the direction of the steering axis L. At a side, spaced apart from the output gear 12 along the wheel axis R, the wheel 10 is connected for co-rotation to the wheel shaft 11. Thus, rotation (third rotation) of the output gear 12 is transferred to the wheel 10 via the wheel shaft 11. As shown, sections of the wheel 10 are received between the first drive gear ring 44 and the second drive gear ring 54. The gear rings 44, 54 are spaced apart along their rotational axis, which corresponds to the steering axis L and span a wheel receiving space 3 between them. Both drive gear rings 44, 54 have a ring opening 44', 54' extending along the steering axis L through the relevant drive gear ring 44, 54. At least on its side facing the ground B, the wheel 10 extends through the respective ring opening 44', 54'.

The wheel 10 is arranged in the wheel receiving space 3 and leads to three advantageous effects. The design space of the wheel module 2 is significantly reduced due to the wheel 10 not being required to revolve around the drive gear rings 44, 54 upon a steering movement about the steering axis L. The possible steering angle is extended due to the wheel 10 being able to be rotated by 360° or multiple times by 360° in the drive gear rings 44, 54, without the steering movement, rotation about the steering axis L, being restricted. In addition, the wheel 10 is protected by the wheel module 2. The first and second drive gear rings 44, 54 form a cage around the wheel 10.

Figure 2:
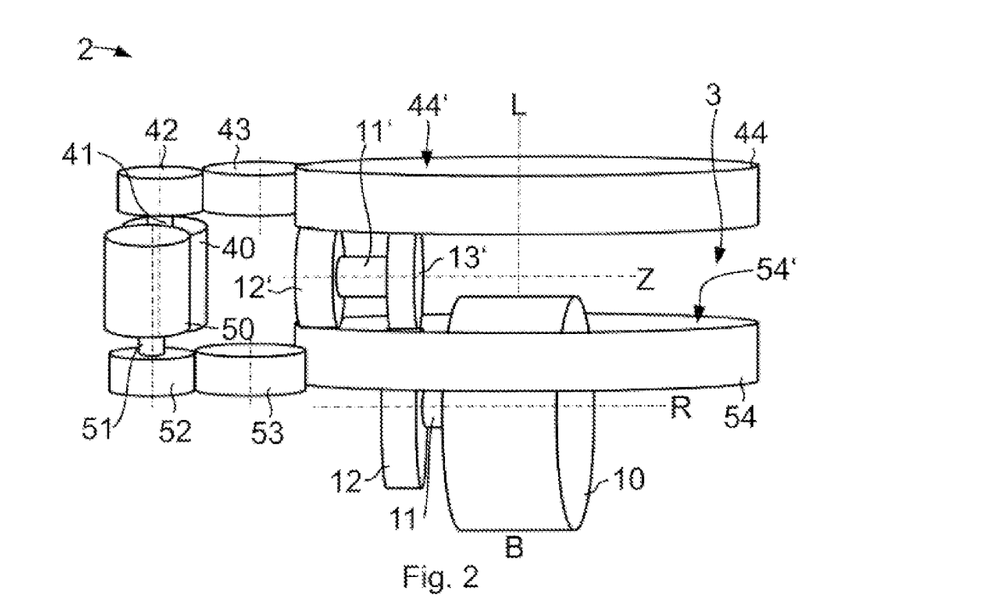
FIG. 2 is a schematic perspective view of a second variation of a wheel module.
Figure 3:
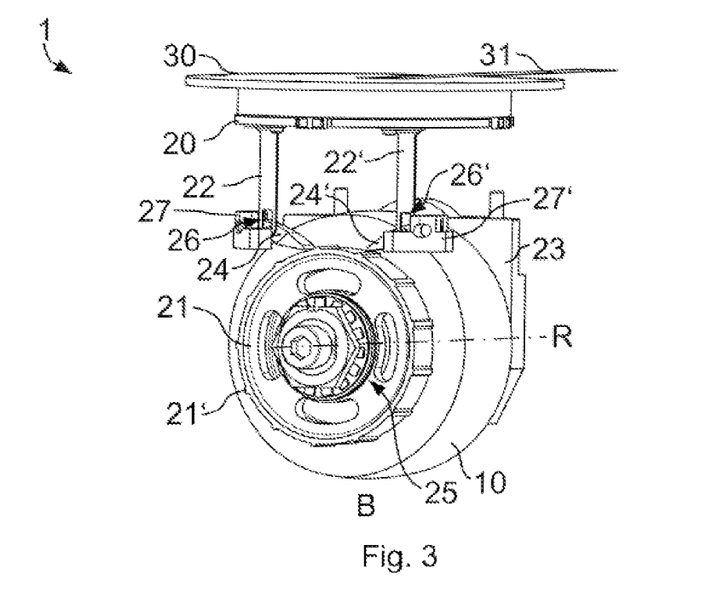
FIG. 3 is a first perspective view of a brake module.
Figure 4:
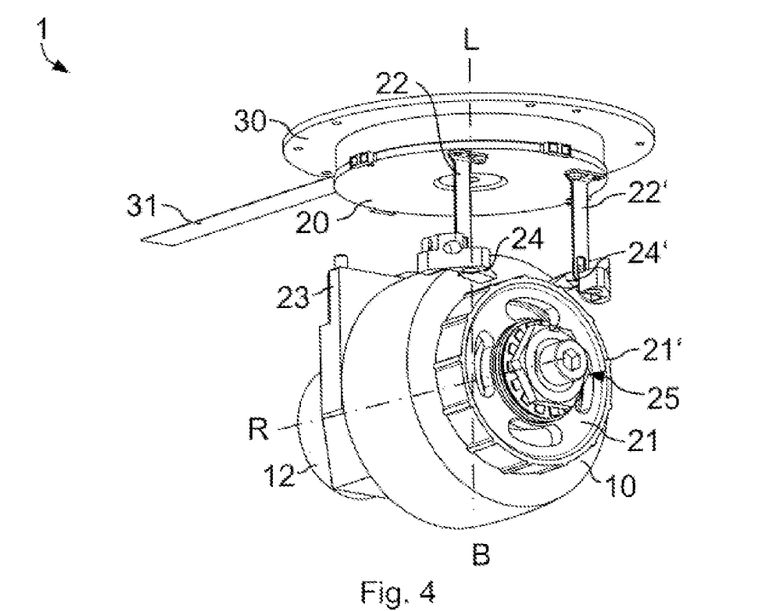
FIG. 4 is a second perspective view of the brake module.

Compared to the wheel module 2 of FIG. 1, the embodiment of the wheel module 2 depicted in FIG. 2 has an additional intermediate shaft 11', intermediate drive wheel 12', and intermediate output wheel 13'. The intermediate shaft 11' extends along and is rotatable about an intermediate axis Z parallel to the wheel axis R. The intermediate drive wheel 12' and the intermediate drive wheel 13' are secured, connected for co-rotation, to the intermediate shaft 11' at a first side along the intermediate axis Z and at an opposite second side along the intermediate axis Z, respectively. The intermediate drive wheel 12' is configured as a gear and engages the first and second drive gear ring 44, 54. Thus, the intermediate shaft 11', with the intermediate drive wheel 12' and the intermediate output wheel 13', is rotatable about the intermediate axis Z, via the intermediate drive wheel 12', by the rotation of the first and second drive gear rings 44, 54. The intermediate output wheel 13' is also configured as a gear and its teeth mesh with teeth of the output gear 12. The rotation along the intermediate axis Z is transferred to the output gear 12, to the wheel shaft 11, and the wheel 10 by the intermediate output wheel 13'. Thus, whereby the wheel 10 is drivable about the wheel axis R. With this variation it is possible to increase the ground clearance without increasing a wheel diameter of the wheel 10.

The variations of the wheel module 2, shown in FIGS. 1 und 2, are examples and intended to illustrate a wheel module 2 that can be provided with the brake module 1 according to the disclosure.

FIGS. 3 to 7 show a variation of a brake module 1 in different views and states, as can be employed in a wheel module 2, as is shown in FIG. 1 or 2, for example.

The wheel 10 is received for co-rotation at a wheel shaft 11 rotating with the wheel 10, which, hover, is hidden in FIGS. 3 to 7. Adjacent to the wheel 10, a brake wheel 21, designed as a cam wheel, is also provided on the wheel shaft 11. It is connected to the wheel shaft 11 via a sliding clutch or sliding hub 25. Further, a support element 23 is provided where the wheel shaft 11 is supported. The support element 23, in particular, may serve to support the wheel 10 and the wheel shaft 11 in the wheel module 2.

The brake module 1 further includes an anchor plate 20 with two transfer elements 22, 22' fixed to it and extending from the anchor plate 20 to the brake wheel 21. With respect to the ground B, on which the wheel 10 is supported during intended use, the anchor plate 20 is arranged above the wheel 10, and the transfer elements 22, 22' extend downwards towards the ground B. The anchor plate 20, together with the wheel shaft 11 and the components received thereon, such as the wheel 10, the brake wheel 21 and the support element 23, is rotatable about the steering axis L. In the embodiment shown, the anchor plate 20 is configured as an essentially round disc, with the steering axis L passing through the center of the round disk and intersecting the wheel axis R, about which the wheel 10 is drivable with the wheel shaft 11. In addition, a lifting unit 30 is provided that is stationary with respect to the rotation of the steering axis L. The lifting unit 30 is decoupled from the other components with respect to the steering movement about the steering axis and spaced apart from the anchor plate 20 by an air gap S.

Accordingly, the brake module 1 is divided into two assemblies. The first assembly is configured to rotate with the wheel 10 and the shaft 11 and comprises at least the brake wheel 21 and the anchor plate 20 with the transfer elements 22, 22' extending to the brake wheel 21. The second assembly is configured to switch from a state not braking the wheel 10 (first state) to a state braking the wheel 10 (second state). To this end, the second assembly comprises the lifting unit 30, which herein has an electromagnet, that can be supplied with current and controlled via the electric connecting lead 31.

The anchor plate 20 can be moved along the steering axis L by the electromagnetism of the lifting unit 30. The path along which the anchor plate 20 can be moved is restricted by stop elements so that an air gap S always remains between the lifting element 30 and the anchor plate 20. The rotation of the anchor plate 20 about the steering axis L is not impeded or braked by the lifting unit 30.

Figure 5:
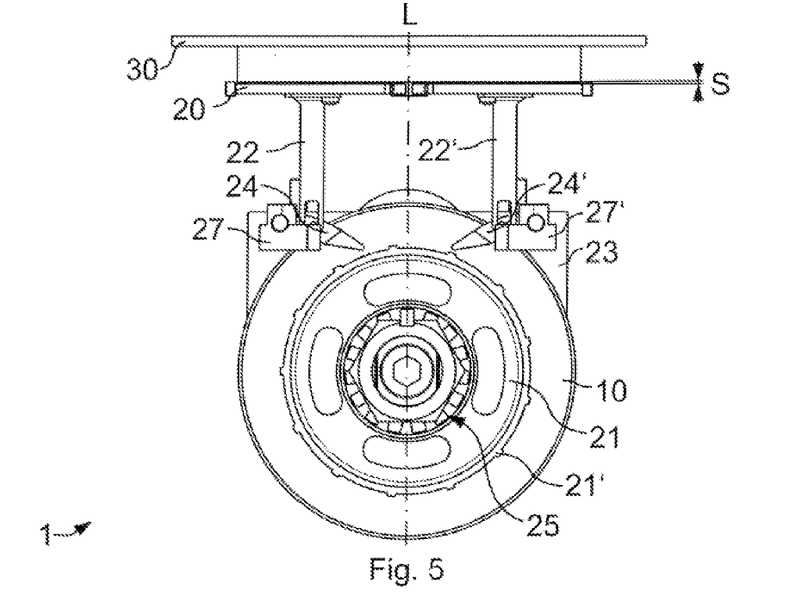
FIG. 5 is a front elevation view of the brake module in the first state.

FIG. 5 shows the first state of the brake module 1, where the wheel 10 is not braked by the brake module 1 and the anchor plate 20 is moved to an upper position towards the lifting element 30. To maintain the state, a current is applied at the electromagnet of the lifting unit 30 so that the anchor plate 20 is constantly drawn towards the lifting element 30. Thus, the air gap S remains between the anchor plate 20 and the lifting unit 30. By switching off the electromagnet of the lifting unit 30 or reversing its polarity, the brake module 1 is switched to the second state depicted in FIG. 6. Here, where the anchor plate 20 is moved to the lower end position and the transfer elements 22, 22' or their pawls 24, 24' abut against the brake wheel 21 thereby blocking the wheel 10.

Figure 6:
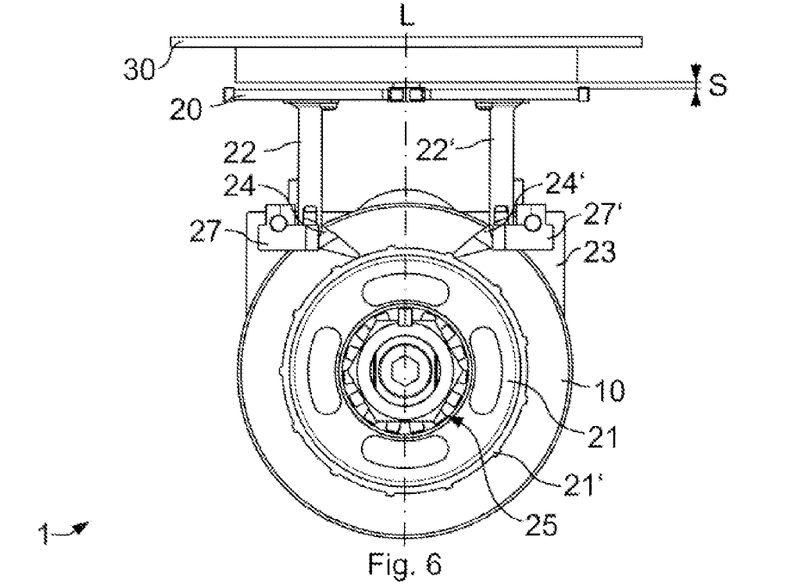
FIG. 6 is a front elevation view of the brake module in the second state.
Figure 7:
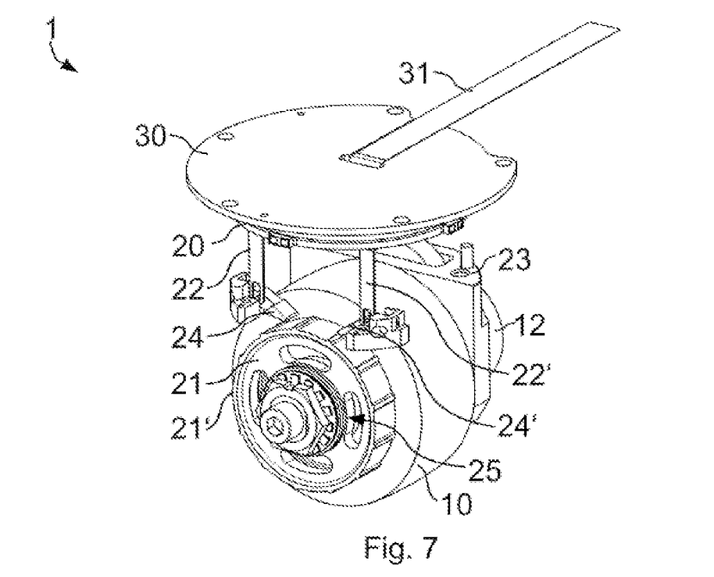
FIG. 7 is a third perspective view of the brake module.

The air gap S between the lifting unit 30 and the anchor plate 20 is significantly bigger or larger in the second state than in the first state.

The brake module 1 shown in FIGS. 3 to 7 provides a pawl mechanism at the anchor plate 20, the transfer elements 22, 22', that latches against cams 21' of the brake wheel 21, configured as a cam wheel. The advantage of this is that the lifting unit 30 is not required to apply a continuous brake force to the anchor plate 20, but that merely the pawls 24, 24' need to be engaged and automatically latch against the cams 21' at the brake wheel 21.

The two transfer elements 22, 22' provided at the anchor plate 20 are spaced apart along a transverse axis extending orthogonally to the wheel axis R and to the steering axis L. At their end section facing the brake wheel 21, each has a slot 26, 26', through which the pawls 24, 24' can be controlled, moved out.

The pawls 24, 24' are each rotatably supported about an axis parallel to the wheel axis R in a pawl receptacle 27, 27' with a support section and engage in the slot 26, 26' of the respective transfer element 22, 22'. A pin is arranged between the support section and the latching section of the respective pawl 24, 24'.

In the present variations, the pawl receptacles 27, 27' are configured separate from each other and separate from the support element 23, but can also be of an integral design. According to the variations shown, the pawl receptacles 27, 27' and the support element 23 are connected to each other via a bearing element, not shown, and are configured to rotate about the steering axis L as a unit with the wheel 10, upon a steering movement. The bearing element can be a radial bearing or a bearing ring, for example.

In the first state, where the anchor plate 20 is moved to the lifting unit 30, the pawls 24, 24' are drawn upwards via their pins and the slots 26, 26' configured in the transfer elements 22, 22' and released from an engagement at the brake wheel 21. Upon transitioning from the first to the second state, the pawls 24, 24' are released so that they rotate downwards about their respective rotational axis and abut against the brake wheel 21. The latching sections of the pawls 24, 24' face in opposite directions so that each pawl 24, 24' blocks the brake wheel 21 and thereby the wheel 10 in exactly one rotational direction about the wheel axis R. To this end, a plurality of cams 21' are configured at the brake wheel 21 that, abut against the latching sections of the pawls 24, 24', can latch against the pawls 24, 24'.

To prevent damage to the drive motors 40, 50 or the brake module 1 in case of an error, in addition, a sliding hub 25 is provided between the brake wheel 21 and the wheel shaft 11. The sliding hub 25 only transfers the brake force from the brake wheel 21 to the wheel shaft 11 below a predetermined torque applied at the sliding hub 25.

Figure 8:
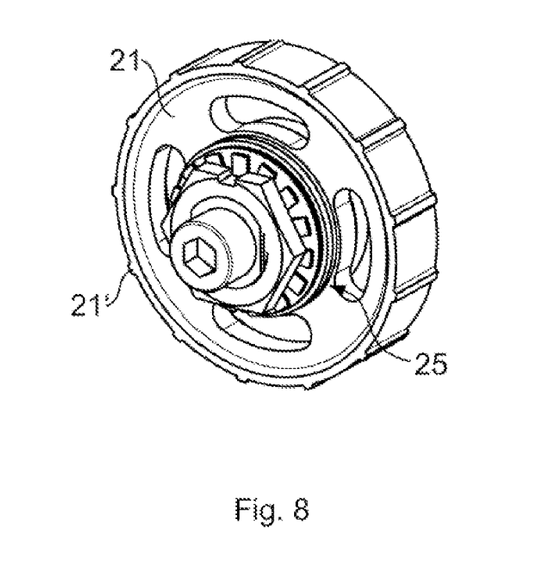
FIG. 8 is a perspective view of a cam wheel.

FIG. 8 provides a detailed view of the brake wheel 21 with the cams 21' evenly distributed at its outer circumference and the sliding hub 25 fixed at its inner circumference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake module of a wheel module with a wheel, the wheel is drivable about a wheel axis by a drive module of the wheel module and steerable about a steering axis, the wheel is received on a wheel shaft and is indefinitely rotatable about the steering axis by the drive module;
    the brake module has an anchor plate arranged adjacent to the wheel and is indefinitely rotatable about the steering axis with the wheel, a lifting unit is fixed adjacent to the anchor plate about the steering axis; and
    a brake wheel arranged at the wheel shaft is rotatable about the wheel axis with the wheel;
    at least one transfer element extends from the anchor plate towards the brake wheel;
    the lifting unit is configured to move the anchor plate from a first state, where the anchor plate and the lifting unit as well as the at least one transfer element and the brake wheel are spaced apart without any contact, to a second state, where the anchor plate and the lifting unit are spaced apart without any contact and the at least one transfer element generates a brake force at the brake wheel.

2. The brake module according to claim 1, further comprising a support element adjacent to the wheel, that is rotatable about the steering axis with the wheel and at which the wheel shaft is supported rotatably about the wheel axis, the anchor plate is further movable along the steering axis with respect to the lifting unit and, with respect to the support element, fixedly connected to the support element about the steering axis (L).

3. The brake module according to claim 1, wherein the brake wheel is a cam wheel and has, at its outer circumference, a least one cam extending outwardly in a radial direction of the brake wheel.

4. The brake module according to claim 3, wherein a pawl is provided at the transfer element at an end section of the at least one transfer element facing the brake wheel, which in the first state, is spaced apart from the brake wheel and, in the second state, can be abutted against the brake wheel with a latching section facing the brake wheel, and the latching section is configured to abut against the cam of the brake wheel in a direction opposite to the rotational direction of the brake wheel.

5. The brake module according to claim 4, wherein the pawl is rotatably supported about an axis parallel to the wheel axis with a support section spaced apart from the latching section.

6. The brake module according to claim 4, wherein exactly two transfer elements are spaced apart from each other and include the pawl provided at each of their end sections facing the brake wheel, the latching sections face each other, and the latching section of the first pawl is configured to abut against one cam, in a direction opposite to a first rotational direction, and the latching section of the second pawl is configured to abut against the cam in a direction opposite to a second rotational direction opposite to the first rotational direction.

7. The brake module according to claim 1, wherein the lifting unit comprises an electromagnet and the anchor plate is magnetic or ferromagnetic, at least in sections, and the electromagnet is configured to magnetically draw the anchor plate towards the lifting unit in the first state.

8. The brake module according to claim 1, wherein the brake module is arranged on a sliding hub and connected to the wheel shaft via the sliding hub, the sliding hub is configured to transfer the brake force from the brake wheel to the wheel shaft, below an adjustable torque and to rotate freely with respect to the brake wheel, from the adjustable torque onwards so that the brake wheel is decoupled from the wheel shaft and the brake force is not transferred from the brake wheel to the wheel shaft.

9. The brake module according to claim 1, wherein the steering axis is coaxial to a vertical axis of the wheel.

10. A wheel module with a wheel, that is drivable about a wheel axis by a drive module of the wheel module and steerable about a steering axis, the wheel is received at a wheel shaft and is indefinitely rotatable about the steering axis by the drive module, and a brake module according to claim 1.

11. The wheel module according to claim 10, having a transmission, the transmission includes a first drive gear ring and a second drive gear ring, that are rotatably arranged about a shared rotational axis, by a respective rotation of the first drive gear ring and the second drive gear ring, the wheel is steerable about the steering axis and drivable about the wheel axis, and between the first drive gear ring and the second drive gear ring, a wheel receiving space extending along the rotational axis is determined, where the wheel is arranged, at least in sections.

12. The wheel module according to claim 11, wherein the rotational axis is coaxial to the steering axis.

13. The wheel module according to claim 10, wherein the anchor plate is arranged in or immediately adjacent to the wheel receiving space, wherein the lifting unit is arranged in or immediately adjacent to the wheel receiving space, and the brake wheel and the at least one transfer element are arranged in the wheel receiving space.

\* \* \* \* \*